Patented July 19, 1949

2,476,372

UNITED STATES PATENT OFFICE 2,476,372

ANTIFOULING COMPOSITION

Ray E. Heiks, Columbus, Ohio, assignor, by mesne assignments, to Phelps-Dodge Corporation, New York, N. Y., a corporation of New York, Anaconda Copper Mining Company, New York, N. Y., a corporation of Montana, and Kennecott Copper Corporation, New York, N. Y., a corporation of New York No Drawing. Application September 6, 1946,
Serial No. 695,274

5 Claims. (Cl. 106—16)

This invention relates to an antifouling composition containing metallic copper in combination with zinc oxide and has for its principal object the production of a composition of matter having greatly improved antifouling characteristics.

Metallic copper and zinc oxide have not heretofore been combined in antifouling compositions, although each of these ingredients are well-known in the art. Metallic copper is an old and well-known toxic, and zinc oxide has been used as a pigment or filler almost from the inception of the art relating to antifouling compositions. It was early recognized, however, that metallic copper alone was highly corrosive to iron or steel surfaces, and its antifouling effect was not fully appreciated, possibly due to the fact that it gained but limited use. Later on, when compositions and paint systems had been discovered which decreased the corrosiveness of the metallic copper, it was discovered that this material had a definite toxic effect, but it was not sufficiently toxic to produce a completely satisfactory antifouling composition. Zinc oxide, on the other hand, was known to have no toxic effect and was incorporated merely as a filler to provide a satisfactory pigment-volume ratio and to harden the paint film.

It has been discovered that the use of metallic copper and zinc oxide in combination with one another in an antifouling composition produces antifouling properties markedly superior to those obtained in compositions containing either of these ingredients alone. The improvement obtained by the use of the combination of metallic copper with zinc oxide is so great that the effect is clearly synergistic rather than additive.

Antifouling compositions are generally provided in the form of paints, although they may be produced in other forms. In making antifouling paints, it is the usual procedure to employ a toxic material to prevent or to inhibit the attachment of marine organisms to the structure to be protected while it is immersed in sea water. In addition, these paints may contain a pigment or pigments, such as coloring compounds, fillers, or inert materials, and a binder or vehicle to impart film-forming characteristics to the composition.

The various ingredients may be incorporated in any order, although the usual manner is the incorporation of the pigments in the binder and subsequent addition of the toxic ingredient. A suitable solvent may then be added to obtain the desired viscosity, which will vary according to the conditions under which the paint is to be applied.

In order to be effective, the antifouling composition must prevent adherence of marine organisms to the surface of the paint, and the paint must strongly adhere to the structure to be protected; the former effect is obtained by the addition of toxic materials to the composition, and the latter effect is produced by properly preparing the surface over which the paint is to be applied. PVR (pigment-volume ratio) is also a factor in the adherence of the paint to the marine structure, and it, as well as other factors which might contribute to varying results, was controlled during the tests hereinafter described. The pigment-volume ratio may be defined as the ratio between the total volume of the pigments and the total volume of the composition including the vehicle (excluding volatile materials). Its relevancy and adjustment are well known in the art, and a detailed discussion thereof is not material to the present invention.

In the antifouling composition of the present invention, the metallic copper and zinc oxide must, of course, be employed in amounts which are significant and in compositions having a satisfactory vehicle and PVR, but the ratio of the metallic copper to the zinc oxide is considerably more limiting as respects the successful production of an improved antifouling composition. The upper limit of the copper/zinc oxide ratio is established by that amount of zinc oxide which will have a synergistic effect upon the copper, thus producing a highly satisfactory antifouling result. The lower limit of the copper/zinc oxide ratio is established by the minimum amount of copper which, in conjunction with the zinc oxide, will produce a satisfactory antifouling effect over a given period of time. These limits may be fairly definitely established for any particular working conditions, but they will vary according to the place where the composition is to be used and, in some cases, according to the balance of the composition.

By actual tests, it has been found that a copper/zinc oxide ratio of about 13.2 to 1 produces a superior antifouling composition when compared to standard antifouling compositions heretofore in use. However, a copper/zinc oxide ratio varying from 0.33 to 1 to 3.3 to 1 has been found to produce antifouling compositions having an effectiveness many times greater than that of the present-day compositions. A ratio of copper to zinc oxide of 1.45 to 1 is preferred under most of the conditions tested. As above stated, the preferred ratio of copper to zinc oxide will vary according to the location in which the antifouling composition is to be employed, and the above-designated ratios apply particularly to the conditions under which the compositions were tested, as hereinafter described. Consequently, copper/zinc oxide ratios of 13.2 to 1 and 0.33 to 1 only approximate the upper and lower limits, respectively.

The metallic copper may be in a variety of forms as long as it is comminuted to a sufficient extent. Powdered copper and flaked copper have been found satisfactory and may be added in the form of a paste, such as that made by incorporating copper flake in about 1/5 of its weight of a non-drying oil. Copper powder in the flake form of the type known commercially as "copper bronze powder" is especially suitable. Zinc oxide may be satisfactorily incorporated as a powder, as is usual or customary in any of the many applications of this ingredient as a pigment or inert filler.

Other components which may be added to the antifouling composition forming the present invention are pigments or inert materials such as silica, magnesium silicate, and barytes; toxic materials (or so considered) such as mercuric oxide and cuprous oxide; and vehicles or binders composed of such ingredients as rosin plasticized with coal tar or other suitable plasticizers. The particular vehicle employed is not material to the present invention, and any one of a number of vehicles customarily employed in the antifouling art may be used. It is known in the art, however, that the vehicle employed must be sufficiently permeable to water to permit enough of the toxic ingredients in the antifouling composition to be dissolved therethrough to produce a satisfactory antifouling effect. It is also known in the art that the vehicle employed must be substantially water insoluble, as that term is employed in every day usage, although all vehicles are water soluble to some extent and some are described in the art as "soluble."

In order to more clearly disclose the present invention, the following exemplary compositions are set forth:

EXAMPLE 1

| Ingredient | Weight in Grams | Per Cent in Dry Film |
|---|---|---|
| Zinc oxide | 67.3 | 27.0 |
| Silica | 22.1 | 8.9 |
| Magnesium silicate | 20.4 | 8.2 |
| Copper paste | 63.0 (51.28 gms. Cu) | 20.6 |
| Rosin | 70.3 | 28.2 |
| Coal tar | 17.8 | 7.1 |
| Pine oil | 11.1 | |
| Xylene | As desired for thinning | |

EXAMPLE 2

| Ingredient | Weight in Grams | Per Cent in Dry Film |
|---|---|---|
| Zinc oxide | 67.3 | 26.8 |
| Silica | 22.1 | 8.8 |
| Magnesium silicate | 20.4 | 8.1 |
| Copper paste | 14.9 (12.1 gms. Cu) | 4.8 |
| Cuprous oxide | 41.1 | 16.4 |
| Rosin | 70.3 | 28.0 |
| Coal tar | 17.8 | 7.1 |
| Pine oil | 11.1 | |
| Xylene | As desired for thinning | |

EXAMPLE 3

| Ingredient | Weight in Grams | Per Cent in Dry Film |
|---|---|---|
| Zinc oxide | 120.4 | 40.34 |
| Magnesium silicate | 33.1 | 11.09 |
| Copper paste | 63.8 (51.9 gms. Cu) | 17.39 |
| Rosin | 74.3 | 24.89 |
| Coal tar | 18.8 | 6.30 |
| Pine oil | 11.7 | |
| Xylene | As desired for thinning | |

EXAMPLE 4

| Ingredient | Weight in Grams | Per Cent in Dry Film |
|---|---|---|
| Zinc oxide | 48.11 | 20.31 |
| Silica | 15.8 | 6.67 |
| Magnesium silicate | 15.58 | 6.58 |
| Copper paste | 85.1 (69.3 gms. Cu) | 29.25 |
| Rosin | 70.3 | 29.68 |
| Coal tar | 17.8 | 7.51 |
| Pine oil | 11.1 | |
| Xylene | As desired for thinning | |

EXAMPLE 5

| Ingredient | Weight in Grams | Per Cent in Dry Film |
|---|---|---|
| Zinc oxide | 5.0 | 2.36 |
| Silica | 26.05 | 12.31 |
| Magnesium silicate | 26.42 | 12.49 |
| Copper paste | 81.1 (66.02 gms. Cu) | 31.20 |
| Rosin | 70.3 | 33.22 |
| Coal tar | 17.8 | 8.41 |
| Pine oil | 11.1 | |
| Xylene | As desired for thinning | |

EXAMPLE 6

| Ingredient | Weight in Grams | Per Cent in Dry Film |
|---|---|---|
| Zinc oxide | 20.0 | 9.12 |
| Silica | 22.42 | 10.22 |
| Magnesium silicate | 22.72 | 10.36 |
| Copper paste | 81.1 (66.02 gms. Cu) | 30.11 |
| Rosin | 70.3 | 32.06 |
| Coal tar | 17.8 | 8.12 |
| Pine oil | 11.1 | |
| Xylene | As desired for thinning | |

EXAMPLE 7

| Ingredient | Weight in Grams | Per Cent in Dry Film |
|---|---|---|
| Zinc oxide | 200.0 | 56.48 |
| Copper paste | 81.1 (66.02 gms. Cu) | 18.64 |
| Rosin | 70.3 | 19.85 |
| Coal tar | 17.8 | 5.03 |
| Pine oil | 11.1 | |
| Xylene | As desired for thinning | |

The above compositions were tested according to a standard method which comprises coating both sides of a primed steel panel with the antifouling composition to be tested and followed by immersion in sea water at points where fouling was known to occur. At given intervals the panels are removed from the water for a short period of time and inspected to determine the amount of marine material which has become attached thereto. Those panels which are entirely free of marine organisms, such as barnacles, bryozoa, serpulids, and the like, are given a fouling rating of 10; whereas, a fouling rating of zero indicates complete coverage of the coated panel with marine matter. Thus, it is apparent that the fouling rating is an indication of the unfouled area on the panel being tested. When panels similarly coated are immersed at different spots along the Eastern and Gulf coast, the fouling ratings may differ by as much as 4 to 5 points for the same panels. Furthermore, different inspectors rate the same panels differently. Consequently, the following tests have, for the most part, been made by the same inspector upon panels immersed at the same location. Since comparative tests can be made accurately only where the compositions are of similar nature, approximately the same pigment-volume ratio has been maintained for all of the compositions tested.

The fouling ratings obtained by testing the compositions set forth in the above examples are given in the following Table 1:

*Table 1*

| Example No. | Copper/Zinc Oxide Ratio | Fouling Rating After— | | | |
|---|---|---|---|---|---|
| | | 5 mos. | 6 mos. | 11 mos. | 23 mos. |
| 1 | 0.76/1 | 10 | | 9.5 | 8.1 |
| 2 | 0.18/1 | 6 | | F | |
| 3 | 0.43/1 | 10 | | 8.4 | 7.3 |
| 4 | 1.45/1 | 10 | | 9.8 | 8.2 |
| 5 | 13.2/1 | | 9 | | |
| 6 | 3.3/1 | | 10 | | |
| 7 | 0.33/1 | | 10 | | |

The following compositions have been used as antifouling compositions and are given as being representative of the prior art:

EXAMPLE 8

| Ingredient | Weight in Grams | Per Cent in Dry Film |
|---|---|---|
| Zinc oxide | 67.3 | 34.0 |
| Silica | 22.1 | 11.2 |
| Magnesium silicate | 20.4 | 10.3 |
| Rosin | 70.3 | 35.5 |
| Coal tar | 17.8 | 9.0 |
| Pine oil | 11.1 | |
| Xylene | (1) | |

[1] As desired for thinning.

EXAMPLE 9

| Ingredient | Weight in Grams | Per Cent in Dry Film |
|---|---|---|
| Zinc oxide | 67.3 | 26.7 |
| Silica | 22.1 | 8.8 |
| Magnesium silicate | 20.4 | 8.1 |
| Cuprous oxide | 41.1 | 16.3 |
| Mercuric oxide | 12.7 | 5.0 |
| Rosin | 70.3 | 27.9 |
| Coal tar | 17.8 | 7.1 |
| Pine oil | 11.1 | |
| Xylene | 95.5 | |

EXAMPLE 10

| Ingredient | Weight in Grams | Per Cent in Dry Film |
|---|---|---|
| Copper paste | 170.2 (138.5 gms. Cu) | 64.30 |
| Rosin | 61.4 | 28.5 |
| Coal tar | 15.5 | 7.20 |
| Pine oil | 9.7 | |

The following Table 2 summarizes the data obtained by testing compositions in Examples Nos. 8, 9, and 10 in a manner similar to that employed in testing the compositions shown in the first seven examples:

*Table 2*

| Example No. | Per Cent Zinc Oxide | Per Cent Copper Oxide | Per Cent Copper Flake | Fouling Rating After | | |
|---|---|---|---|---|---|---|
| | | | | 5 mos. | 11 mos. | 17 mos. |
| 8 (zinc alone) | 34.0 | | | F (in 100 days) | | |
| 9 (zinc oxide plus copper oxide) | 26.7 | 16.3 | | 6 | F | |
| 10 (copper flake) | | | 64.3 | 10 | 4.8 | F |

In connection with the above data, it is to be noted that the fouling rating of F indicates that the panel became completely covered with marine material and was removed without further testing. For practical purposes, however, such as the employment of antifouling paints upon ships, a fouling rating of about 5 indicates that the paint should be removed and the entire ship repainted. It may be concluded from the data shown by Example No. 2 that a copper/zinc oxide ratio of 0.18 to 1 does not effect a satisfactory antifouling action in spite of the fact that cuprous oxide was employed as an additional toxic agent. Example No. 3 having a copper/zinc oxide ratio of 0.43 to 1 clearly shows that at that ratio the copper and zinc oxide produce a highly satisfactory antifouling composition, and Example No. 7 in which the copper/zinc oxide ratio is reduced to 0.33 to 1 still appears to be satisfactory. The copper/zinc oxide ratio may go as high as 13.2 to 1, as shown in Example 5, and still produce a satisfactory antifouling composition. It is apparent, however, that greatly superior results are obtained when the copper and zinc oxide are employed in nearly equal amounts with a slight excess of copper, as in Examples 1 and 4.

When zinc alone was used, as in Example No. 8, the composition failed within 100 days after immersion in the sea water. Copper flake alone, as in Example No. 10, was a great deal more effective than the zinc oxide, but at 11 months the paint was in such poor condition that, if it had been upon a ship, it would have had to have been removed and at 17 months it failed completely. The zinc oxide and cuprous oxide mixture disclosed in Example No. 9 is one which is frequently employed and represents a high-grade commercial antifouling paint. This composition, as shown in Table 2, was questionable even at 5 months, having a fouling rating of only 6, and failed completely after 11 months.

In connection with the above data, it is important to note that all of the panels tested were treated according to a two primer-two paint system in the manner well known to the art. The resulting paint film was usually between about 2 to about 5 mils thick.

It is thus apparent that the combination of metallic copper and zinc oxide produces a synergistic reaction as is evidenced by the facts that zinc oxide alone produces no anti-fouling characteristic, that metallic copper alone shows a fouling rating of 4.8 after 11 months, and that the combination of copper with zinc oxide shows, as indicated in Examples 3 and 4, a fouling rating of 7.3 and 8.2, respectively, after 23 months.

It is clear from the above-detailed description that the present invention relates to an antifouling composition comprising metallic copper and zinc oxide in combination with one another. By employing these particular ingredients in antifouling compositions, antifouling paints and the like may be produced which have increased antifouling effectiveness over a period of time extending far beyond that of present commercial antifouling compositions.

Variations and modifications of the present invention not disclosed in the above description will become evident to those skilled in the art, and such of these modifications and variations as fall within the scope of the appended claims are included as a part of the present invention.

What is claimed is:

1. An antifouling composition comprising in combination metallic copper and zinc oxide in substantial amounts and in a ratio to one another ranging from 0.33 to 1 to 13.2 to 1 and a suitable water permeable, substantially water insoluble vehicle.

2. An antifouling composition comprising metallic copper and zinc oxide in substantial amounts bearing a ratio to one another, respectively, not to exceed about 3.3 to 1 and not less than about 0.33 to 1, and a water permeable, substantially water insoluble vehicle.

3. An antifouling composition comprising metallic copper and zinc oxide in a ratio to one another ranging from 13.2 to 1 to 0.33 to 1 in amounts sufficient to provide a synergistic reaction, and a suitable vehicle which is water permeable to the extent that toxic material may be dissolved therethrough so as to produce an antifouling effect, and which is substantially water insoluble.

4. An antifouling composition consisting essentially of metallic copper, zinc oxide, suitable pigments, and a substantially water insoluble binder which is sufficiently water permeable as not to obstruct the antifouling effect of the toxic compound, said copper and zinc oxide being present in substantial amounts and in a ratio ranging from 0.33 to 1 up to 13.2 to 1.

5. An antifouling composition consisting essentially of zinc oxide, silica, magnesium silicate, copper paste consisting essentially of about 80% copper flake and about 20% of a non-drying oil, rosin, coal tar, and pine oil, said copper in the copper paste and zinc oxide being present in such amounts as to form a ratio of metallic copper to zinc oxide of approximately 1.45 to 1.

RAY E. HEIKS.

REFERENCES CITED

The following references are of record in the file of this patent:

UNITED STATES PATENTS

| Number | Name | Date |
|---|---|---|
| 2,390,408 | Young | Dec. 4, 1945 |

FOREIGN PATENTS

| Number | Country | Date |
|---|---|---|
| 423,876 | Great Britain | Feb. 11, 1935 |

OTHER REFERENCES

Industrial & Engineering Chemistry, April 1944, pages 341–344.

Circular No. 259 of Scientific Section of the Paint Manufacturer's Association of the U. S. January 1926, pages 267 and 270.